United States Patent
McKnight et al.

(10) Patent No.: US 7,297,252 B2
(45) Date of Patent: Nov. 20, 2007

(54) CATALYST ACTIVATION IN THE PRESENCE OF OLEFINIC HYDROCARBON FOR SELECTIVE NAPHTHA HYDRODESULFURIZATION

(75) Inventors: Craig A. McKnight, Sherwood Park (CA); Gregory J. Troxclair, Baton Rouge, LA (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 449 days.

(21) Appl. No.: 10/735,468

(22) Filed: Dec. 12, 2003

(65) Prior Publication Data

US 2004/0154960 A1 Aug. 12, 2004

Related U.S. Application Data

(60) Provisional application No. 60/439,677, filed on Jan. 13, 2003.

(51) Int. Cl.
*C10G 45/04* (2006.01)

(52) U.S. Cl. .................. 208/213; 208/216 R; 208/217; 502/20

(58) Field of Classification Search .............. 208/213, 208/216 R, 217; 502/20
See application file for complete search history.

(56) References Cited

U.S. PATENT DOCUMENTS

| | | | |
|---|---|---|---|
| 2,913,405 A | 11/1959 | Shalit | 208/213 |
| 2,983,669 A | 5/1961 | Noll | 208/97 |
| 3,876,532 A | 4/1975 | Plundo et al. | 208/216 |
| 3,981,796 A | 9/1976 | Hilfman | 208/215 |
| 4,066,740 A | 1/1978 | Erickson | 423/628 |
| 4,132,632 A | 1/1979 | Yu et al. | 208/216 |
| 4,140,626 A | 2/1979 | Bertolacini et al. | 208/216 R |
| 4,149,965 A | 4/1979 | Pine et al. | 208/216 R |
| 4,348,271 A | 9/1982 | Swan | 208/89 |
| 5,286,373 A | 2/1994 | Sudhakar et al. | 208/216 R |
| 5,346,609 A | 9/1994 | Fletcher et al. | 208/89 |
| 5,401,389 A | 3/1995 | Mazzone et al. | 208/89 |
| 5,527,750 A * | 6/1996 | Haun, deceased et al. | 502/20 |
| 5,770,047 A | 6/1998 | Salazar et al. | 208/254 R |
| 5,846,406 A | 12/1998 | Sudhakar et al. | 208/216 R |
| 6,197,718 B1 | 3/2001 | Brignac et al. | 502/216 |
| 6,231,754 B1 | 5/2001 | Brignac et al. | 208/217 |

* cited by examiner

*Primary Examiner*—Glenn Caldarola
*Assistant Examiner*—Prem C. Singh
(74) *Attorney, Agent, or Firm*—J. H. Takemoto; L. E. Carter

(57) ABSTRACT

An improved catalyst activation process for olefinic naphtha hydrodesulfurization. This process maintains the sulfur removal activity of the catalyst while reducing the olefin saturation activity.

15 Claims, 4 Drawing Sheets

CATALYST ACTIVATION IN THE PRESENCE OF OLEFINIC HYDROCARBON FOR SELECTIVE NAPHTHA HYDRODESULFURIZATION

CROSS-REFERENCE TO RELATED APPLICATION

This application claims benefit of U.S. Provisional Patent Application Ser. No. 60/439,677 filed Jan. 13, 2003.

FIELD OF THE INVENTION

The present invention relates to an improved catalyst activation process for cat naphtha hydrodesulfurization. The catalyst activation method maintains the sulfur removal activity of the catalyst while reducing the olefin saturation activity.

BACKGROUND OF THE INVENTION

It is well known that a substantial portion of the hydrocarbon fractions used to prepare fuels such as motor gasoline are derived from the catalytic cracking of heavy petroleum fractions such as vacuum gas oils. The cracked materials are typically distilled into fractions including naphtha, heating oil, and diesel fuel.

Cracked naphthas are obtained from catalytic crackers in relatively high volumes and generally have good octane numbers. They are major components in blending for the motor gasoline pool. A substantial portion of the octane rating of cracked naphtha is due to its high olefin content.

Among the primary contaminants in feeds to fluidized catalytic cracking units (FCCU's) are sulfur bearing materials. These sulfur contaminants result in the appearance of sulfur species in the cracked products. Heavy gasoline components are known to accumulate sulfur impurities. It is well known to subject sulfur contaminated components to hydrodesulfurization to reduce the concentration of sulfur-bearing species in the desirable components.

Hydrotreating of petroleum feedstocks to remove heteroatoms, particularly sulfur, is an important factor in refineries in order to meet ever more demanding regulations relating to sulfur in fuels. These regulations are in response to environmental concerns, and the regulatory pressure to reduce the sulfur content of fuels has been, and will likely continue to be, directed at increasingly smaller concentrations.

Hydrodesulfurization is one of the fundamental hydrotreating processes of the refining and petrochemical industries. The removal of feed sulfur by conversion to hydrogen sulfide is typically achieved by reaction with hydrogen over non-noble metal sulfides, especially those of Co/Mo and Ni/Mo, at fairly severe temperatures and pressures to meet product quality specifications, or to supply a desulfurized stream to a subsequent sulfur sensitive process such as reforming.

Some naphtha fractions containing olefins, for example, cracked naphthas or coker naphthas, typically contain over about 20 wt. % olefins. At least a portion of the olefins is hydrogenated to saturated hydrocarbons during the hydrodesulfurization operation. Because olefins are high octane components, it is usually desirable to retain the olefins rather than to convert them to saturated compounds. Conventional fresh hydrodesulfurization catalysts have both hydrogenation and desulfurization activity. Hydrodesulfurization of cracked naphthas using conventional naphtha desulfurization catalysts under conventional startup procedures and under conditions required for sulfur removal, produces a significant loss of olefins through hydrogenation. This results in a lower grade fuel product which needs more refining, such as isomerization, blending, or other refining, to produce higher octane fuel, adding significantly to production expenses.

Selective hydrodesulfurization to remove sulfur while minimizing hydrogenation of olefins and octane reduction by various techniques, such as selective catalysts, have been described. For example, U.S. Pat. Nos. 4,132,632 and 4,140,626 disclose selective desulfurization of cracked naphtha using specific catalysts having particular amounts of Group VI and VIII metals on magnesia support. Also described is a process for starting-up naphtha hydrodesulfurizaton using partially deactivated hydrotreating catalyst under relatively low pressure in U.S. Pat. No. 4,149,965. The catalyst is partially deactivated using a substantially non-metals containing hydrocarbonaceous oil.

Hydrodesulfurization catalysts age, losing activity during use by collecting deposits of carbonaceous material and/or impurities, such as metals, from the treated feedstock. Eventually, with increased deposition, the catalyst is no longer able to provide effective hydrodesulfurization. The deactivated catalyst may be regenerated and reused, but is generally less effective than fresh catalyst by requiring higher temperature to give the desired activity and becoming deactivated more quickly than fresh catalyst. Although hydrodesulfurization catalysts can usually be repetitively regenerated, they eventually become irreversibly deactivated, or spent, essentially losing their intended hydrodesulfurization utility.

It is known to hydrodesulfurize an olefinic naphtha by adding a nitrogen compound to the feed in order to deactivate the catalyst for the hydrodesulfurization reaction, see U.S. Pat. No. 2,913,405.

Hydrodesulfurization of middle distillate, virgin oils using spent hydrotreating catalysts has been carried out under extremely mild conditions to reduce acid and mercaptan content, see U.S. Pat. No. 3,876,532. Also known in the art is a process for selectively hydrodesulfurizing naphtha by contacting the naphtha, which contains olefins and thiohydrocarbons, with hydrogen under vigorous hydrodesulfurization conditions in the presence of essentially deactivated hydrodesulfurization catalyst which selectively produces hydrogen sulfide, desulfurized hydrocarbons and a relatively high olefin content, see U.S. Pat. No. 5,286,373.

Finally, U.S. Pat. No. 6,197,718 B1 discloses a catalyst activation process in which the catalyst is heated in the presence of a virgin naphtha. The activated catalyst is used in the selective hydrodesulfurization of a naphtha containing sulfur and olefins. While this is effective, this process has drawbacks, such as, for example the cost of facilities to bring virgin naphtha into the cracked naphtha hydrotreater.

Although some of the above processes have met with commercial success, there still remains a need in the art for improved activation processes for cat naphtha desulfurization catalysts that do not require the use of an additional deactivation step or the use of a feed that would not normally be readily-available.

SUMMARY OF THE INVENTION

In accordance with the present invention there is provided a process for the activation of a supported catalyst for the selective hydrodesulfurization of a naphtha feedstock and a process for the selective hydrodesulfurization of a naphtha feedstock without saturating a significant amount of olefins.

The process for the activation of a supported catalyst for the selective hydrodesulfurization of a naphtha feedstock comprises:
a) heating the catalyst to a temperature of about 350 to about 450° F. in the presence of hydrogen and hydrogen sulfide, and in the presence of an olefinic naphtha at an effective pressure between 100 and 500 psig;
b) holding the catalyst at about 350 to about 450° F. for an effective amount of time so that at least 20% of the metals capable of being sulfided are sulfided; and
c) further heating said catalyst to a temperature from about 550 to about 700° F. in the presence of hydrogen and hydrogen sulfide and in the presence of an olefinic naphtha and at an effective pressure such substantially all of the remaining metals from step (b) that were not sulfided are sulfided.

Another embodiment of the invention is a process for the selective hydrodesulfurization of a naphtha feedstock containing olefins such that less than 50 wt. % of the olefins, based on the naphtha feedstock, are saturated, the process comprising:
contacting the naphtha feedstock with a catalyst that has been activated by a process comprising:
a) heating the catalyst to a temperature of about 350 to about 450° F. in the presence of hydrogen and hydrogen sulfide, and in the presence of an olefinic naphtha at an effective pressure such that the environment is not a reducing environment;
b) holding the catalyst at 350 to about 450° F. for an effective amount of time so that at least 20% of the metals capable of being sulfided are sulfided; and
c) further heating said catalyst to a temperature from about 550 to about 700° F. in the presence of hydrogen and hydrogen sulfide and in the presence of olefinic naphtha and at an effective pressure such that substantially all of the remaining metals from step (b) that were not sulfided are sulfided.

In a preferred embodiment of the present invention the temperature of step a) is obtained by ramping at a rate of about 10° F. to about 100° F. per hour.

In another preferred embodiment of the present invention the total pressure is from about 100 to 500 psig.

DETAILED DESCRIPTION OF THE INVENTION

Figure 1:
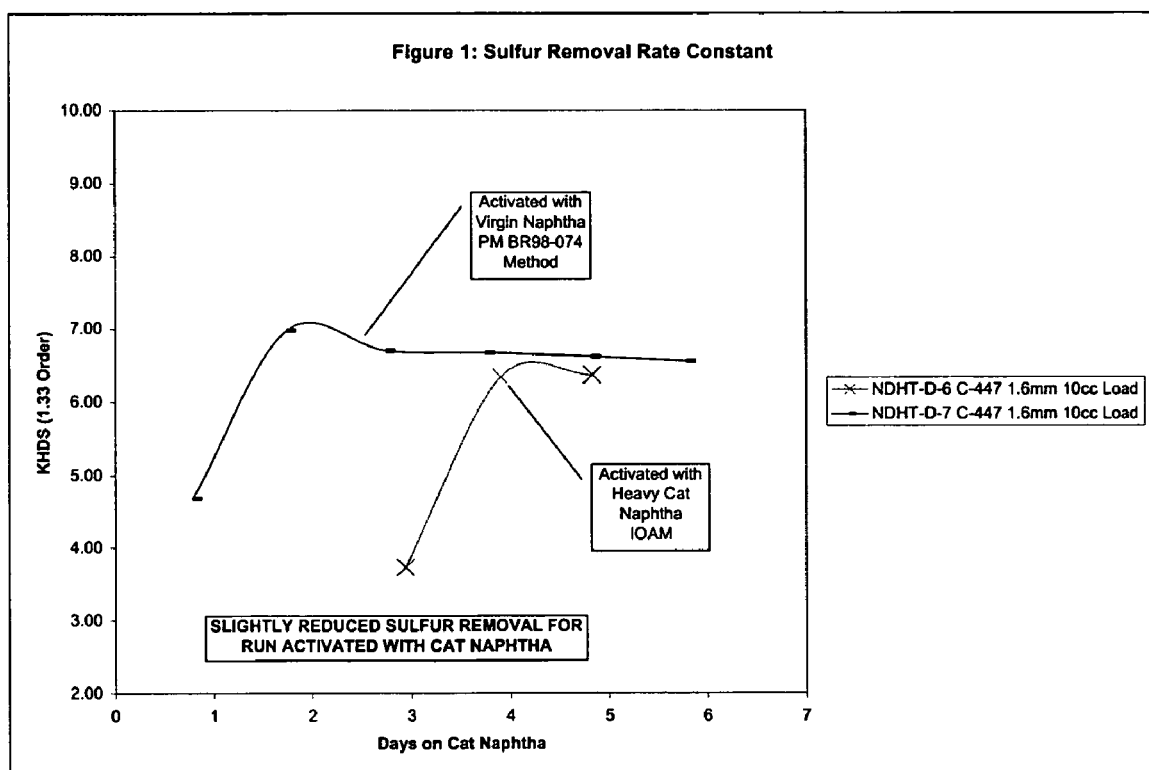
FIG. 1 is a plot of data showing catalyst activity for desulfnrization for a catalyst activated using virgin cat naphtha vs. the a catalyst activated using heavy cat naphtha according to the invention.

This invention enables the selective hydrodesulfurization of a naphtha feedstock that contains significant amounts of both sulfur and olefins, while minimizing loss in octane due to saturation of olefins in the naphtha. Naphtha feedstocks suitable for use in the present invention can comprise any one or more refinery streams boiling in the range from about 10° C. (50° F.) to about 232° C. (450° F.), at atmospheric pressure. The naphtha feedstock generally contains cracked naphtha which usually comprises fluid catalytic cracking unit naphtha (cat naphtha), coker naphtha, hydrocracker naphtha, resid hydrotreater naphtha, debutanized natural gasoline (DNG), and gasoline blending components from other sources wherein a naphtha boiling range stream can be produced. Cat naphtha and coker naphtha are generally more olefinic naphthas since they are products of catalytic and/or thermal cracking reactions, and are the more preferred streams for use in the present invention.

The naphtha feedstock, preferably a cracked naphtha feedstock, generally contains not only paraffins, naphthenes, and aromatics, but also unsaturates, such as open-chain and cyclic olefins, dienes, and cyclic hydrocarbons with olefinic side chains. Cracked naphtha feedstock generally comprises an overall olefins concentration ranging as high as about 60 wt. %, more typically about 5 wt. % to 50 wt. %, and most typically from about 5 wt. % to about 40 wt. %. The cracked naphtha feedstock can comprise a diene concentration of as much as 15 wt. %, preferably from about 0.02 wt. % to about 15 wt. %, and more preferably from about 0.02 to 5 wt. %, based on the weight of the feedstock. The cracked naphtha feedstock sulfur content will generally range from about 0.01 wt. % to about 0.7 wt. % and more typically from about 0.05 wt. % to about 0.5 wt. % based on the total weight of the feedstock. Nitrogen content will generally range from about 5 wppm to about 500 wppm, and more typically from about 20 wppm to about 200 wppm.

Any suitable naphtha hydrodesulfurization catalyst can be used in the practice of the present invention. Generally, such catalysts will be comprised of at least one Group VIII metal, selected from Ni and Co and at least one Group VI metal selected from Mo and W, and an inorganic support material. It is preferred for naphtha desulfurization that the Group VIII metal be Co and the Group VI metal be Mo. The concentration of metal will typically be from about 2 to 60 wt. %, preferably from about 5 to 50 wt. %, and more preferably from about 8 to 40 wt. %. The ratio of Group VIII metal to Group VI metal will typically be from about 0.5:1 to about 100:1, preferably from about 1:1 to about 20:1; and more preferably from about 0.6:1 to about 10:1. The surface area, pore volume, grain size, skeletal or grain density, for, and other characteristics of the catalyst may be any effective, including known type or amount. Illustrative catalysts are presented in the Oil and Gas Journal, dated Oct. 14, 1991 on pages 43 to 78, which is incorporated herein by reference.

A particularly preferred catalyst is one having properties which include: (a) a $MoO_3$ concentration of about 1 to 10 wt. %, preferably about 2 to 8 wt. %, and more preferably about 4 to 6 wt. %, based on the total weight of the catalyst; (b) a CoO concentration of about 0.1 to 5 wt. %, preferably about 0.5 to 4 wt. %, and more preferably about 1 to 3 wt. %, also based on the total weight of the catalyst; (c) a Co/Mo atomic ratio of about 0.1 to about 1.0, preferably from about 0.20 to about 0.80, more preferably from about 0.25 to about 0.72; (d) a median pore diameter of about 60 Å to about 200 Å, preferably from about 75 Å to about 175 Å and more preferably from about 80 Å to about 150 Å; (e) a $MoO_3$ surface concentration of about $0.5 \times 10^{-4}$ to about $3 \times 10^{-4}$ g. $MoO_3/m^2$, preferably about $0.75 \times 10^{-4}$ to about $2.5 \times 10^{-4}$, more preferably from about $1 \times 10^4$ to about $2 \times 10^{-4}$; and (f) an average particle size diameter of less than 2.0 mm, preferably less than about 1.6 mm, more preferably less than about 1.4 mm, and most preferably as small as practical for a commercial hydrodesulfurization process unit. The most preferred catalysts will also have a high degree of metal sulfide edge plane area as measured by the Oxygen Chemisorption Test described in "Structure and Properties of Molybdenum Sulfide: Correlation of $O_2$ Chemisorption with Hydrodesulfurization Activity", S. J. Tauster et al., *Journal of Catalysis*, 63, pp. 515-519 (1980), which is incorporated herein by reference. The Oxygen Chemisorption Test involves edge-plane area measurements made wherein pulses of oxygen are added to a carrier gas stream and thus rapidly traverse the catalyst bed. For example, the oxygen chemisorption will be from about 800 to 2,800, preferably from about 1,000 to 2,200, and more preferably from about 1,200 to 2,000 μmol oxygen/gram $MoO_3$. The terms hydrotreating and hydrodesulfurization are sometimes used interchangeably in this document.

The hydrogen may be provided as substantially pure hydrogen gas or may contain inert or other gases, including light hydrocarbons. Any hydrogen not consumed during the reaction may be recycled for reuse. The hydrogen is generally provided as hydrogen-containing gas with a major amount of, over half up to nearly pure, hydrogen gas with the balance being inert or hydrocarbon gases. The amount of hydrogen used may be any amount effective for hydrodesulfurization to occur. Typically, hydrogen is added for continuous reactions at a treat gas ratio of from about 89 $m^3/m^3$ (500 scf/B) to about 890 $m^3/m^3$ (5,000 scf/B), preferably from about 214 $m^3/m^3$ (1,200 scf/B) to about 540 $m^3/m^3$ (3,000 scf/B), wherein scf/B means standard cubic feet per barrel.

The present invention is practiced by first heating the catalyst to a first end temperature of about 177° C. (350° F.) to about 232° C. (450° F.) in an atmosphere containing hydrogen and hydrogen sulfide at a concentration that will provide a non-reducing environment. By non-reducing, it is meant that the Mo and Co oxides present are not reduced to Mo and Co oxides having a lower oxidation state than the original Mo and Co oxide. The heating to this first end temperature is conducted in an effective amount of time. The amount of time is set by ramping the temperature at a rate such that a non-reducing sulfiding environment is maintained. This heating rate will typically be from about 5.6° C./hr (10° F./hr) to about 56° C./hr (100° F./hr), preferably from about 16.7° C./hr (30° F./hr) to about 33.3° C./hr (60° F./hr). This heating will be conducted in a hydrogen/hydrogen sulfide environment, in the presence of olefinic naphtha, preferably a heavy cat naphtha, and at an effective pressure from about 100-500 psig. Typical pressures will be from about 790-3548 kPa (100 to 500 psig) total pressure, preferably about 1825-2514 kPa (250 to 350 psig) total pressure. By olefinic naphtha we mean a naphtha that comes from a cracked naphtha and has a boiling range of 166 to 246° C. (330-475° F.), preferably 177-232° C. (350-450° F.) more preferably 177-221° C. (350-430° F.). An olefinic naphtha as used herein will typically have a sulfur content of from about 0.01 to about 0.7 wppm and a nitrogen content of from about 5 wppm to 500 wppm. The olefin content of these naphthas will typically be above about 5 wt. %, preferably in the range of about 5 to about 50 wt. %, based on the olefinic naphtha stream.

The catalyst will be held at this first end temperature for an effective amount of time, i.e. a time sufficient to sulfide at least about 20% of the metal of said catalyst. This holding period will typically be from about 2 hours to about 24 hours, preferably from about 5 hours to about 15 hours.

The catalyst, after said holding period, will be heated to a second end temperature at an effective heating rate. This second heating will also be in the presence of a hydrogen/hydrogen sulfide environment and also in the presence of an olefinic naphtha. The heating rate and the total pressure will be such that a non-reducing sulfiding environment is maintained. The heating rate and the total pressure will be within the ranges given for heating to the first end temperature. The catalyst will be held at this second end temperature also for an effective amount of time, i.e. for a time sufficient to allow substantially complete sulfiding of the catalytic metals of said catalyst.

In the process for selective hydrodesulfurization of a naphtha feedstock, preferably a cat naphtha feedstock, the naphtha feedstock is contacted with an activated catalyst which has been activated as described above. The process conditions include temperatures of from about 200° C. to about 400° C., pressures of from about 689-3447 kPa (about 100-500 psia), liquid hourly space velocities of from about 1 to about 10 and hydrogen treat gas rate of from about 178 $m^3/m^3$ to about 712 $m^3/m^3$ (1000 to 4000 scf/B). While any reactor and contacting configuration is suitable for use in contacting the naphtha feedstock with a catalyst activated according to the process described herein, it is preferred to use a fixed bed down-flow reactor.

This invention will be further understood by the following examples, which are presented for illustrative purposes and are not to be limiting in any way.

EXAMPLES

Example 1

Figure 2:
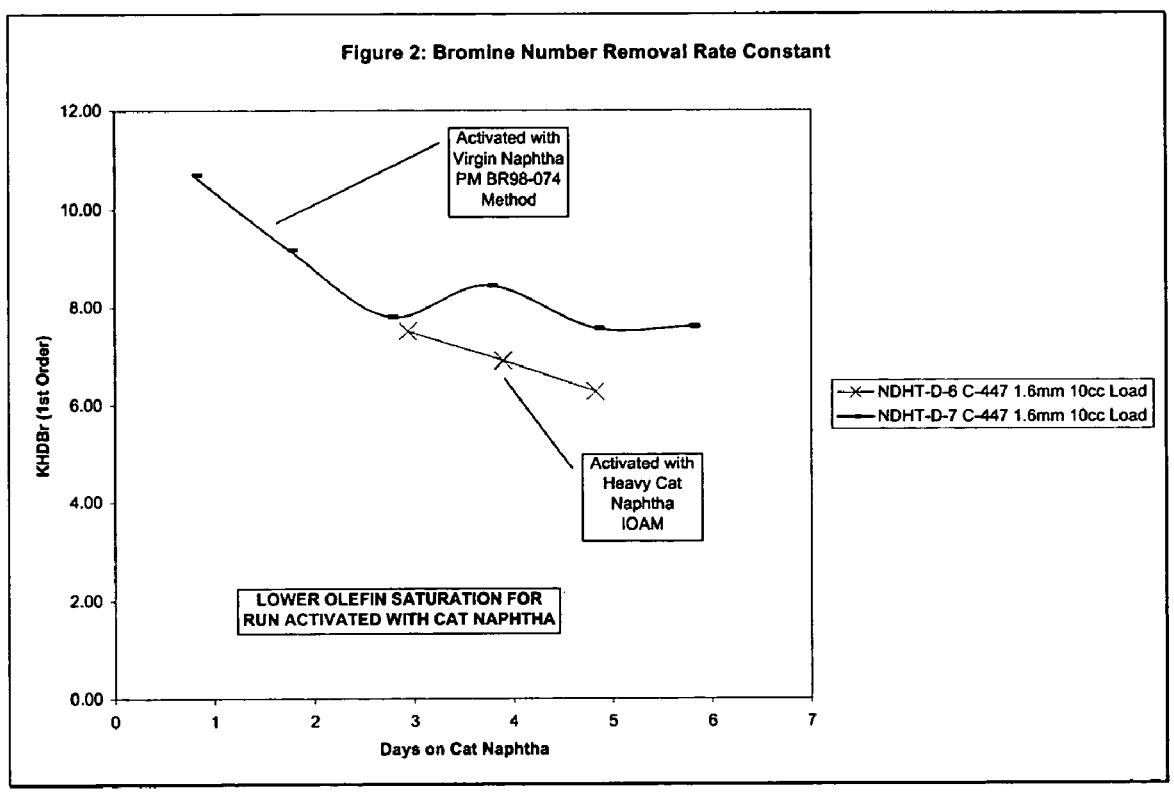
FIG. 2 is a plot of data showing olefin saturation for a cat naphtha using a catalyst activated using virgin cat naphtha vs. a catalyst activated using heavy cat naphtha.

A commercially prepared, reference batch of C-447 was used in this test. The catalyst (C-447) consisted of 15.30 wt. % $MoO_3$, 4.32 wt. % CoO. The catalyst was tested in a commercially available 1.6 mm trilobe size. The Improved Olefinic Activation Method (IOAM) was performed in-situ with a 10 mole % $H_2S/H_2$ gas blend (1724 scf/bbl gas rate) and a Heavy Cat Naphtha feed, 162-475° F. boiling range, 1850 wppm total sulfur, and 26 bromine number (LHSV=6.5 l/hr). Conditions were held for approximately 14 hrs at two holding temperatures, 204° C. (400° F.) (gas/liquid mixed phase) and 343° C. (650° F.) (all vapor phase) with reactor pressure of 2170 kPa (300 psig). The reactor was then cooled to 121° C. (250° F.) before the introduction of the cat naphtha feed. The test was performed in an isothermal, downflow, all vapor-phase pilot plant. The activity test used the same Heavy Cat Naphtha feed. Catalyst volume loading was 10 cubic centimeters. Reactor conditions were 260° C. (500° F.), 463 $m^3/m^3$ (2600 scf/bbl), 100% hydrogen treat gas and 2170 kPa (300 psig) total inlet pressure. Space velocity was held constant at 6.5 LHSV. HDS levels ranged between 90.6 and 96.0% and olefin saturation between 43.1 and 35.8%. For comparison, standard pilot plant activation of the same batch of C-447 (10 cc volume) was performed in-situ with a 10 mole % $H_2S/H_2$ gas blend (1724 scf/bbl gas rate) and a virgin naphtha (LHSV=6.5 l/hr). Other parameters were kept the same as the Improved Olefinic Activation Method and activity tested the same way. FIG. 1, attached, shows that the IOAM preserves catalyst activity for desulfurization of a Heavy Cat Naphtha. FIG. 2, attached, shows that the IOAM reduces olefin saturation activity. Table 1, attached, summarizes the benefit from the Improved Olefinic Activation Method. For comparison purposes, results from Example 1 in U.S. Pat. No. 6,197,718 on C-447, but activity tested with a different feed Baton Rouge heavy cat naphtha feedstock, are included for reference. In all the tables to follow, numbers in brackets for the IOAM cases were estimated assuming constant selectivity based on 1.33 order HDS and 1st order olefin saturation kinetics.

TABLE 1

Catalyst Activity - Average of 2 Balances

| | Example 1 - C-447 Catalyst | | |
|---|---|---|---|
| | Original Data U.S. Pat. No. 6,197,718 B1 Activation Method | U.S. Pat. No. 6,197,718 B1 Activation Method | Improved Olefinic Activation Method |
| Average Days on Cat Naphtha | 4.5 | 4.3 | 4.4* |
| Percent HDS | 97.0 | 96.6 | 96.0 (96.6) |
| Percent Olefin Saturation | 43.8 | 44.5 | 37.2 (39.8) |

[*= Includes Activation Days on Cat Naphtha]
[Terms Inside ( ) = Estimated Assuming Constant Selectivity]

As can be seen from the data in Table 1, the improved activation method according to the present invention gives an improved, i.e. lower, value for olefin saturation over the equivalent activation method from U.S. Pat. No. 6,197,718 which uses virgin cat naphtha instead of olefinic cat naphtha.

Example 2

Figure 3:
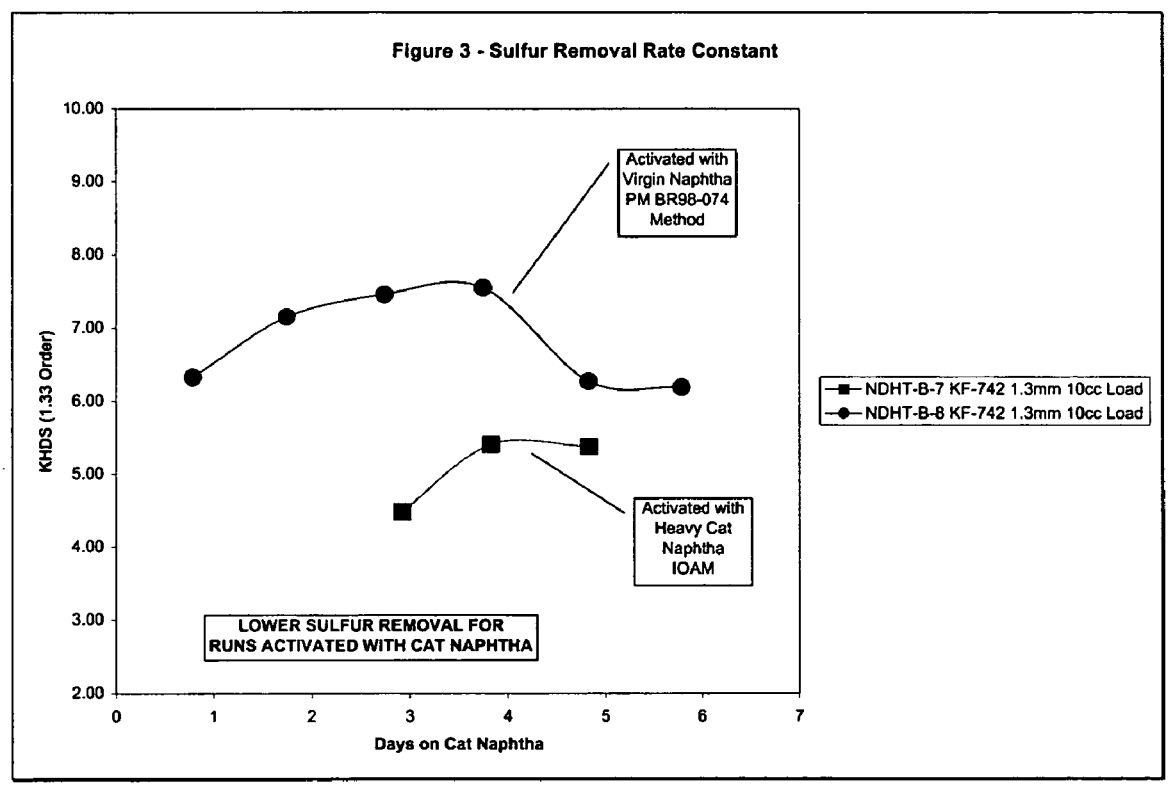
FIG. 3 is plot of data showing a further comparison of catalyst activity for desulfurization for a catalyst activated using virgin cat naphtha vs. the a catalyst activated using heavy cat naphtha according to the invention.
Figure 4:
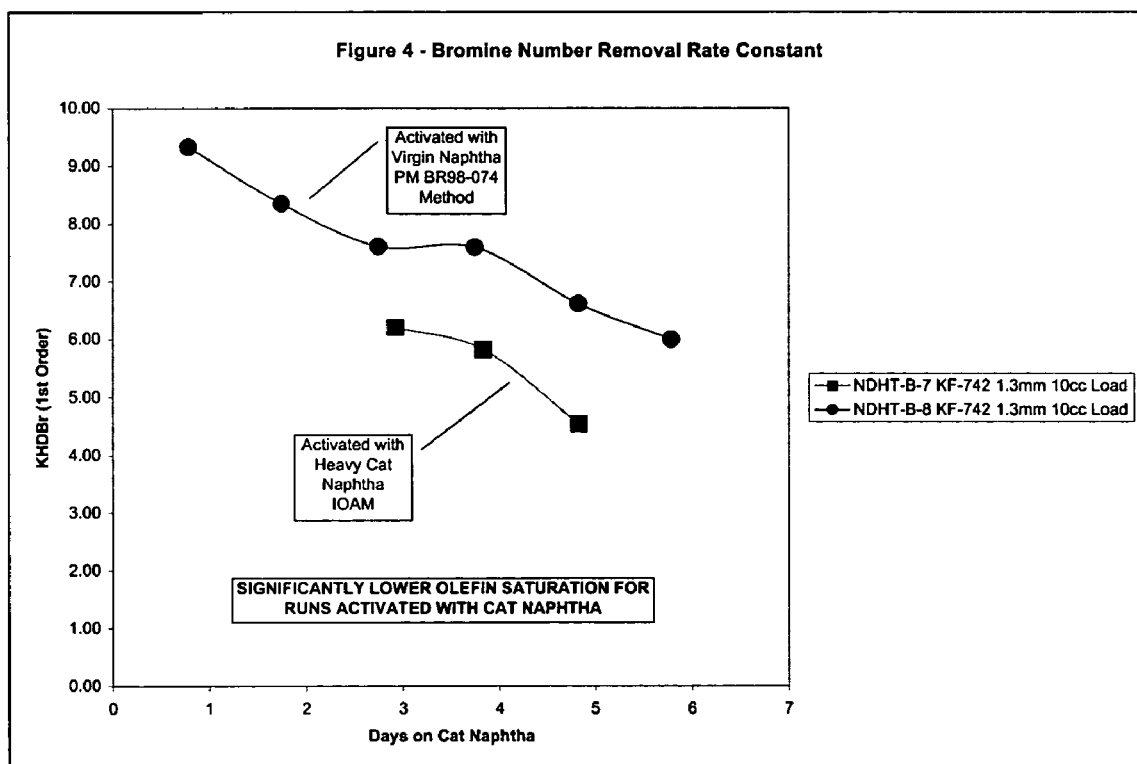
FIG. 4 is a plot of data showing a further comparison of olefin saturation of a cat naphtha using a catalyst activated using virgin cat naphtha vs. a catalyst activated using heavy cat naphtha.

A commercially prepared, reference batch of KF-742 (10 cc charge) was used in this test. The catalyst (KF-742) consisted of 15.0 wt. % $MoO_3$, 4.0 wt. % CoO. The catalyst was tested in a commercially available 1.3 mm asymmetric quadralobe size. The Improved Olefinic Activation Method was performed in-situ with a 10 mole % $H_2S/H_2$ gas blend and a Heavy Cat Naphtha feed with conditions as reported above. The activity test was performed in an isothermal, down-flow, all vapor-phase pilot plant using the same Heavy Cat Naphtha feed and conditions as above. HDS levels ranged between 92.7 and 94.4% and olefin saturation between 26.7 and 36.2%. For comparison, standard pilot plant activation of the same batch of KF-742 (10 cc volume) was performed in-situ with a 10 mole % $H_2S/H_2$ gas blend and a virgin naphtha. Other parameters were kept the same as the Improved Olefinic Activation Method and activity tested the same way. FIG. 3, attached, shows that the IOAM reduces catalyst activity for desulfurization of a Heavy Cat Naphtha. FIG. 4, attached, shows that the IOAM significantly reduces olefin saturation activity. Table 2, attached, summarizes the benefit from the Improved Olefinic Activation Method.

TABLE 2

Catalyst Activity - Average of 2 Balances

| | Example 2 - KF-742 Catalyst | |
|---|---|---|
| | U.S. Pat. No. 6,197,718 B1 Activation Method | Improved Olefinic Activation Method |
| Average Days on Cat Naphtha | 4.3 | 4.3* |
| Percent HDS | 96.6 | 94.2 (96.6) |
| Percent Olefin Saturation | 39.4 | 30.0 (36.9) |

[*= Includes Activation Days on Cat Naphtha]
[Terms Inside ( ) = Estimated Assuming Constant Selectivity]

The data in Table 2 again demonstrates that the present activation method produces superior olefin saturation over the equivalent method from U.S. Pat. No. 6,197,718.

Examples 3 and 4

Similar side by side activations and activity tests were performed with commercially prepared batches of KF-840 (Ni/Mo catalyst 7.5 cc charge) and KF-752 (Co/Mo 10 cc charge). As shown in Table 3, the results were qualitatively the same as Examples 1 and 2. The Improved Olefinic Activation Method provided no (Example 3) or little effect on HDS but reduced the amount of olefin saturation.

TABLE 3

Catalyst Activity - Average of 2 Balances

| | Example 3 - KF-840 Catalyst | | Example 4 - KF-752 Catalyst | |
|---|---|---|---|---|
| | U.S. Pat. No. 6,197,718 B1 Activation Method | Improved Olefinic Activation Method | U.S. Pat. No. 6,197,718 B1 Activation Method | Improved Olefinic Activation Method |
| Average Days on Cat Naphtha | 4.3 | 4.3* | 4.3 | 4.3* |
| Percent HDS | 92.5 | 92.5 | 94.7 | 92.9 (94.7) |
| Percent Olefin Saturation | 39.6 | 36.3 | 38.2 | 28.7 (32.6) |

[*= Includes Activation Days on Cat Naphtha]
[Terms inside ( ) = Estimated Assuming Constant Selectivity]

The invention claimed is:

1. A process for the activation of a supported catalyst for the selective hydrodesulfurization of a naphtha feedstock comprising:
    a) heating the catalyst to a temperature of about 350 to about 450° F. in the presence of hydrogen and hydrogen sulfide, and in the presence of an olefinic naphtha at an effective pressure between 100 and 500 psig;
    b) holding the catalyst at about 350 to about 450° F. for an effective amount of time so that at least 20% of the metals capable of being sulfided are sulfided; and
    c) further heating said catalyst to a temperature from about 550 to about 700° F. in the presence of hydrogen and hydrogen sulfide and in the presence of an olefinic naphtha and at an effective pressure such that substantially all of the remaining metals from step (b) that were not sulfided are sulfided.

2. The process of claim 1 wherein the naphtha feedstock is a cracked naphtha feedstock and contains about 5 wt. % to about 50 wt. % olefins.

3. The process of claim 2 wherein the naphtha feedstock has a diene concentration of about 0.02 to 15 wt. %.

4. The process of claim 1 wherein the temperature of step a) is reached by beating at a rate of about 5.6° C. to aboat 56° C. per hour.

5. The process of claim 1 wherein the total pressure is from about 100 to about 500 psig.

6. The process of claim 2 wherein the naphtha feedstock is a eat naphtha and contains a sulfur concentration of about 0.01 to 0.7 wt. %, based on the total weight of the naphtha feedstock.

7. The process of claim 6 wherein the naphtha feedstock is selected from the group consisting of cat naphtha, coker naphtha, hydrocracker naphtha. resid, and hydrotreater naphtha.

8. A process for the selective hydrodesulfurization of a naphtha feedstock containing olefins such that less than 50 wt. % of the olefins, based on the naphtha feedstock, are saturated comprising:

contacting the ruaphtha feedstock with a catalyst that has been activated by a process comprising:
a) heating the catalyst to a temperature of about 350 to about 450° F. in the presence of hydrogen and hydrogen sulfide, and in the presence of an olefinic naphtha at an effective pressure such that the environment is not a reducing environment;
b) holding the catalyst at about 350 to about 450° F. for an effective amount of time so that at least 20% of the metals capable of being sulfided are sulfided; and
c) further heating said catalyst to a temperature about 550 to about 700° F. in the presence of hydrogen and hydrogen sulfide and in the presence of an olefinic naphtha and at an effective pressure such that the environment is non-reducing, so that substantially all of the remaining metals from step (b) that were not sulfided are sulfided.

9. The process of claim 8 wherein the naphtha feedstock is a cracked naphtha feedstock and contains about 5 wt. % to about 50 wt. % olefins.

10. The process of claim 9 wherein the naphtha feedstock has a diene concentration of about 0.02 to 15 wt. %.

11. The process of claim 8 wherein the temperature of step a) is reached by heating at a rate of about 5.6° C. to about 56° C. per hour.

12. The process of claim 8 wherein the total pressure is from about 100 to about 500 psig.

13. The process of claim 9 wherein the naphtha feedstock is a cat naphtha and contains a sulfur concentration of about 0.05 to 0.7 wt. %, based on the total weight of the naphtha.

14. The process of claim 13 wherein the naphtha feedstock is selected from the group consisting of cat naphtha, coker naplitha, hydrocracker naphtha, resid, and hydrotreater naphtha.

15. The process according to any of the preceding claims wherein said olefinie naphtha is a heavy cat naphtha.

* * * * *